United States Patent
Schmidt, Jr. et al.

(10) Patent No.: US 6,858,695 B2
(45) Date of Patent: Feb. 22, 2005

(54) CURABLE HOT MELT ADHESIVE FOR CASEMAKING

(75) Inventors: Robert C. Schmidt, Jr., Great Meadows, NJ (US); Michael T. Gefri, Blairstown, NJ (US); James W. Nowicki, Hopewell, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 372 days.

(21) Appl. No.: 09/844,907

(22) Filed: Apr. 27, 2001

(65) Prior Publication Data

US 2002/0182350 A1 Dec. 5, 2002

(51) Int. Cl.$^7$ ............................................... C08F 112/08
(52) U.S. Cl. .................... 526/329.2; 526/227; 526/346; 526/335; 412/3; 412/6; 412/9; 156/345.5; 156/908
(58) Field of Search ................................ 526/335, 346, 526/329.2, 227; 412/3, 6, 9; 156/908, 345.5; 19/26; 40/616; 524/80; 525/55, 88

(56) References Cited

U.S. PATENT DOCUMENTS

| | | | |
|---|---|---|---|
| 3,573,240 A | | 3/1971 | Flanagan |
| 4,984,949 A | * | 1/1991 | Reckziegel ..................... 412/8 |
| 5,777,039 A | | 7/1998 | De Craene et al. |
| 5,804,663 A | | 9/1998 | De Craene et al. |
| 6,165,563 A | | 12/2000 | Chandran et al. |
| 6,207,248 B1 | * | 3/2001 | Yang et al. ................. 428/102 |

FOREIGN PATENT DOCUMENTS

| | | |
|---|---|---|
| EP | 0 356 710 B1 | 10/1993 |
| EP | 0 361 122 B1 | 8/1995 |
| WO | WO 98/40225 | 9/1998 |

OTHER PUBLICATIONS

'For and Against Hot–Melts', British Printer v.93 (6) Aug., p. 33.

Hawkes, C.V. and A.R. Hawkes, 'Feasibility study on the use of hot melt adhesives for edition casemaking', Pira Report: PR7 (R)/1978/ PM 5084.

Mielke, G.B., 'Re–kindling hot melts', Book Production Industry V. 50 (6) Nov., pp. 31–32, 34.

* cited by examiner

Primary Examiner—William Cheung
(74) Attorney, Agent, or Firm—Cynthia L. Foulke

(57) ABSTRACT

A curable casemaking adhesive, books and related articles bound thereby. In one embodiment, a UV curable hot melt adhesive is used to form the case, which is preferably also embossed. In another embodiment, a moisture curable hot melt adhesive is used to form the case, which is preferably also embossed.

16 Claims, No Drawings

CURABLE HOT MELT ADHESIVE FOR CASEMAKING

FIELD OF THE INVENTION

The invention relates to the field of casemaking. More specifically, the invention relates to the use of a curable hot melt adhesive and to products, in particular embossed products, constructed with the use of such an adhesive.

BACKGROUND OF THE INVENTION

In recent years, substantial interest has grown in the bookbinding, publishing and printing industries, and in the graphic arts area generally with respect to the development of improved adhesive compositions which lend themselves to casing-in and casemaking.

Casing-in is typically accomplished using a water based emulsion. During the casing-in process, a book block is laminated to the inside of the cover of a hard bound book by coating the outside of the end sheets of the book block with the adhesive, and then bonding the cover to the end sheets.

Casemaking refers to the production of the case or cover, i.e., the outer shell, of a hard bound book. During this process, the material that forms the outer covering of the book is bonded to binder boards to form a "hard" cover. Typically, the covering material is passed along a conveyor during which time binder boards are mated onto the adhesive coated covering material. The surplus covering material is folded over on to the binder board in a two step process known as "turning in" in which either the sides are folded in first and the ends are folded in second resulting in an overlap of the ends over the sides, or the ends are folded in first and the sides second. These are also called "turn-ins." Animal glues are typically used for this process, although water based emulsions may also be used.

Conventional water-based casemaking glues and casing-in pastes contain substantial amounts of water, and moisture from these water based systems can be detrimental to a finished book. Moisture from the adhesive can migrate into the binding board or book block causing cockeling or waviness in the end sheets and/or resulting in warpage of the cover. The presence of moisture may also result in curvature of the cover in relation to the book block, as can lack of register of the cover with the book block.

Both hot melt adhesives and reactive hot melt polyurethane adhesives, also referred to as hot melt moisture curing adhesives, which contain no water, have been proposed for use in the bookbinding industry. Use of a hot melt adhesive for casemaking and/or casing-in is described as reducing warpage during the production of the book and as bestowing a degree of resistance to warp during the life of the book.

One problem which has not been addressed by prior art hot melt applications in the casemaking art is the bleed-through which occurs when the case or cover is embossed, and which damages the embossed surface. Whereas cases manufactured using animal glues may be embossed, embossing a case manufactured with the use of a hot melt adhesive is difficult since the adhesive, in contrast to animal glue, tends to flow during the embossing process. This results in letters, figures, designs, etc. which are not clearly identifiable. The current invention addresses this need in the art.

SUMMARY OF THE INVENTION

The invention provides an adhesive for use in casemaking which minimizes warpage of cases, allows equipment to run in a fast and efficient manner, and allows the case to be embossed without damage to the embossed surface.

One aspect of the invention is directed to an adhesive suitable for use in casemaking and embossing operations.

Another aspect of the invention is directed to a case or cover for a hard bound book comprising a curable hot melt adhesive. In one embodiment, the curable adhesive is a radiation curable adhesive. A preferred radiation curable adhesive is a UV curable adhesive. In a particularly useful embodiment, the adhesive is a semi-pressure sensitive UV curable hot melt adhesive based on either high vinyl content styrene-butidiene-styrene or a mono expoxidized monohydroxylated diene polymer combined with a tackifier and a napthenic or paraffinic oil, plus initiator and stabilizer. In another embodiment the hot melt adhesive is a moisture curable hot melt adhesive. A preferred moisture curable hot melt adhesive is based on a blend of urethane and acrylic monomers or a copolymer of urethane and acrylic monomers.

Yet another aspect of the invention is directed to an embossed product, including but not limited to cases or covers for hard cover books.

Still another aspect of the invention is directed to a method of forming a case or cover by bonding cover boards to book cover stock using a curable hot melt adhesive.

One other aspect of the invention is directed to a method embossing a product, e.g., a case for a hard cover book. An embossed case is formed by bonding the cover boards to the book cover stock using a cured hot melt adhesive, and thereafter embossing the case or cover to form an embossed case for a hard cover book.

A casemaking machine comprising a curing apparatus is also encompassed by the invention.

DETAILED DESCRIPTION OF THE INVENTION

The disclosures of all references cited herein are incorporated in their entireties by reference.

The invention is directed to an adhesive suitable for use in casemaking and embossing operations. Casemaking is a series of carefully synchronized procedures for making the cover of a hard bound book. In general, the material that will form the outer covering of the book, which is in precut or in continuous web form depending on the type of application equipment used, is coated with adhesive, passed along a conveyer under boards which have been precut to the exact size of the finished book cover, the boards are dropped in place and a center strip is laid down between the boards. If the cloth was not precut, it is then cut and, in either case, a portion of the cloth extends about ⅝ inch around the perimeter of the cover boards. This extension is then folded over the boards in a two step "turning-in" process with the sides folded first and the end folded to lap over the sides.

The adhesive used to construct the book cover or book case must possess certain critical properties. Because the operation is a multi-step one, the adhesive chosen must have a relatively long period of aggressive tack so as to retain sufficient tack to instantly hold down the folded extensions without allowing them to spring back during the turning-in step. In addition to its aggressive tack, the adhesive selected must have good machining properties, and it should be able to adhere a wide variety of case stock materials. Furthermore, once the case is formed, the adhesive must not penetrate the stock which would ruin the cover nor may it be affected by moisture, which could cause warping of the cover. Moreover, the cover should be capable of being embossed, without conventional problems associated with embossing operations, in particular bleed through.

Curable hot melt adhesives which may be used in the practice of the invention include radiation curable hot melt adhesives and reactive (i.e., moisture curable) hot melt adhesives. A hot melt adhesive is a thermoplastic material, solid at room temperature, which is applied in its molten form and will adhere to a surface when cooled to a temperature below its melting point. Hot melt adhesives differ from other liquid adhesives in that they set simply by cooling rather than by chemical curing or the evaporation of a solvent. In a curable hot melt adhesive, crosslinking occurs by a variety of mechanisms depending on the formulation, such as by exposure to UV irradiation or by exposure to moisture. In radiation curable hot melt adhesives, crosslinking occurs upon exposure to actinic and/or ionizing radiation. Reactive hot melt polyurethane adhesives depend on the presence of moisture, which is obtained from the substrates or atmosphere, to cure which involves crosslinking to form tough, resilient adhesives.

The curable hot melt adhesives used in the practice of the invention may, desirably, be pressure sensitive or semi-pressure sensitive. As used herein, the term "pressure-sensitive adhesive" refers to a viscoelastic material which adheres instantaneously to most substrates with the application of slight pressure and remains permanently tacky. A polymer is a pressure-sensitive adhesive within the meaning of the term as used herein if it has the properties of a pressure-sensitive adhesive per se or functions as a pressure-sensitive adhesive by admixture with tackifiers, plasticizers or other additives. A semi-pressure sensitive adhesive is one which temporarily possesses sufficient tack to permanently bond the substrate. After this time the adhesive is still permanently tacky but not enough to create a strong bond. Semi-pressure sensitive adhesives are typically used as regular hot melts. That is the bond is made while the adhesive is still molten. The fact that bondable tack extends through the solidification stage creates the opportunity to bond over a wide process range. One cannot coat these types of adhesive and create a bond with them at a later date as with a true pressure sensitive.

The term "curable" is used herein in its conventional sense as meaning capable of forming covalent cross-links.

The term "radiation-curable adhesive" as used herein means an adhesive composition which is curable upon exposure to actinic and/or ionizing radiation. The term "radiation" is used herein to include actinic radiation such as ultraviolet radiation and ionizing radiation created by the emission of electrons or highly accelerated nuclear particles such as neutrons, alpha-particles etc.

The adhesive is used in casemaking operations to bond the cover boards to the cover stock. The cover board or binder boards are generally chip board that has been compressed to give a high bursting strength board, sometimes designated chestnut cover board. Cover stock materials useful for making book covers include, for example, cloth, paper, leather, vinyl, polyethylene, composite materials such as paper or cloth laminated to polyethylene, polyester, or "mylar," and polypropylene, woven fabric, pryoxylin, vinyl or other resin impregnated or coated fabric. In addition a synthetic material comprising a spunbonded olefin of high density polyethylene fibers available from E. I. DuPont de Nemours and Co., Inc. under the tradename Tyvec may be used. Buckram, a conventional library stock material, may also be used in the practice of the invention. The curable hot melt adhesives used herein allow production of cases without limitation to the type of cover stock or cloth used. Use of a curable hot melt adhesive in the preparation of an embossed case or cover in accordance with the invention is particularly useful when employing a porous cover stock.

Previous synthetic adhesive approaches have either lacked the ability to emboss without bleed through or lacked the cohesion when freshly applied thus producing debonding at the corners of the case where the facing substrate is folded over. It has now been discovered that use of curable hot melt adhesives in accordance with the invention will enable the casemaker to emboss the case or cover without damage to the embossed surface of the type heretofore encountered in the art. This is accomplished by the cure, which renders the adhesive non-flowing.

In accordance with the practice of the invention, a case or cover for a hard bound book is typically formed by applying a curable hot melt adhesive to the cover stock, exposing the adhesive to curing conditions (e.g., UV, IR, electron beam, moisture) and bonding the book cover stock to the cover boards. As will be appreciated, depending on the adhesive used, the cover stock may be bonded to the cover board before being subjected to curing conditions. While the adhesive is preferably applied to the cover stock, application of adhesive to the cover board is also possible.

The cover may be embossed, as conventional in the art, using commercially available embossing machine. While separate embossing machinery is typically used for embossing the finished case, the casemaking machinery may comprises an embossing apparatus or mechanism. While embossing typically will be accomplished on the finished case prior to casing-in, embossing may also be accomplished on the finished book, e.g., for the purpose of monogramming, dedication, personalization or the like.

While the disclosure describes in detail preparation of an embossed case or cover, other embossed products are encompassed by the invention. Such embossed products include but are not limited to gift or packaging boxes and the like, jewelry boxes, suitcases, briefcases, and automobile interiors. The products are manufacture by bonding a backing substrate to a cover substrate using a curable hot melt adhesive, and thereafter embossing the cover side of the laminated substrate.

Any conventional casemaking machine modified to accommodate a hot melt adhesive may be used in the practice of the invention, such as those available from Kolbus and from Crathern. Various modifications have been described in the art. See, e.g., Mielke, G. B., November 1974, *Book Production Industry* 50(6):31–32, 34.

In general, a cover material such as a sheet of cloth or sheet of paper is feed through a spreader/gluer where a uniform coating of molten radiation curable or moisture curable hot melt adhesive is applied to the material. The adhesive may be applied by a variety of methods including coating or spraying in an amount sufficient to cause the cover material to adhere to the cover board. The freshly glued cover material is typically passed through a curing apparatus and then bonded to binder boards. The glued cover material/board proceeds to a turning in station where all four sides of the cover material are turned in, or wrapped around the edges of the cover boards. Some machines may also comprise a mitering station which cuts away the cover material at a 450° angle to allow a neat tuck and a well formed corner. The cover is then fed through a rotary press where the cover is pressed to insure that the cover material and boards are securely laminated.

Preferred radiation curable adhesives comprise at least one high vinyl block copolymer. High vinyl block styrene-butadiene-styrene copolymers and/or styrene-isoprene-styrene copolymers are preferred. While radial and linear block copolymers are preferred for use, other block copolymer morphologies can be used as would be recognized by those skilled in the art. The term bock copolymers include di-block, tri-block and multi-block copolymers.

Examples of radiation curable hot melt adhesives which may be used in the practice of the invention will typically comprise from about 5% to about 40% by weight of at least one high vinyl block styrene-butadiene copolymer; from about 30% to about 80% by weight of at least one solid tackifier; from about 0.05% to about 5% by weight of at least one photoinitiator; up to about 15% by weight of at least one high vinyl, linear styrene-butadiene-styrene or multi-block styrene-butadiene copolymer; up to about 15% by weight of at least one high diblock conventional low vinyl styrene-butadiene-styrene or styrene-isoprene-styrene block copolymer; up to about about 40% by weight of at least one oil or liquid tackifier; and up to about 3% by weight of at least one antioxidant.

Suitable high vinyl styrene-butadiene block copolymers include, but are not limited to, four arm radial multi-block styrene-butadiene copolymers comprising 60% vinyl, 26% styrene and a relatively broad molecular weight distribution (Mn=94,200 and Mw=276,100). Such block copolymers include SR8296 available from Firestone.

Suitable high vinyl linear styrene-butadiene block copolymers include, but are not limited to, linear multi-block styrene-butadiene copolymers having 57% vinyl, 44% styrene, melt index=13 (cond. G), (Mw=85,000 and Mn=54,000). Such copolymers include STEREON 857 available from Firestone.

Suitable high diblock conventional low vinyl styrene-butadiene-styrene, or SIS, block copolymers include Asa-prene JT38; Kraton D1119; Quintac SL117; SR 8219.

Multi-block copolymers may be prepared by a variety of methods. One such method is described in U.S. Pat. No. 3,937,760 (The Firestone Tire & Rubber Company). A typical multi-block copolymer is SR8296. This is a four arm radial multi-block styrene-butadiene copolymer comprising 60% vinyl, 26% styrene and a relatively broad molecular weight distribution (Mn=94,200 and Mw=276,100) and is available from Firestone.

Solid hydrogenated tackifying resins are useful in the radiation curable composition of the invention in concentrations ranging from about 30% by weight to about 80% by weight, preferably in amounts ranging from about 45% by weight to about 70%, more preferably from about 50% by weight to about 65% by weight.

Representative tackifying resins include the $C_5/C_9$ hydrocarbon resins, synthetic polyterpenes, rosin, rosin esters, natural terpenes, and the like. More particularly, the useful tackifying resins include any compatible resins or mixtures thereof such as (1) natural and modified rosins including gum rosin, wood rosin, tall oil rosin, distilled rosin, hydrogenated rosin, dimerized rosin, and polymerized rosin; (2) glycerol and pentaerythritol esters of natural and modified rosins, including the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, such as styrene/terpene and alpha methyl styrene/terpene; (4) polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof such, for example, as the resin product resulting from the condensation, in an acidic medium, of a bicyclic terpene and a phenol; (6) aliphatic petroleum hydrocarbon resins resulting from the polymerization of monomers consisting primarily of olefins and diolefins; also included are the hydrogenated aliphatic petroleum hydrocarbon resins; and (7) cyclic petroleum hydrocarbon resins and the hydrogenated derivatives thereof. Also included are the cyclic or acyclic $C_5$ resins and aromatic modified acyclic or cyclic resins. Preferred are hydrogenated, cyclic or $C_5$ resins, such as Escorez 5400 (Exxon), hydrogenated aromatic modified cyclic resin ECR179EX (Exxon). Mixtures of two or more of the above described tackifying resins may be required for some formulations.

The photoinitiators are typically employed in concentrations ranging from about 0.05% by weight to about 5% by weight, preferably in amounts ranging from about 0.2% by weight to about 3% by weight, more preferably from about 0.5% by weight to about 1.5% by weight. The concentration is chosen based on the thickness of the application of the uncured radiation curable composition. Combinations of two or more photinitiators may also be used. Commercial examples include Irgacure 651, 184 and 1700 and Darocur 1173, available from Ciba-Geigy as well as Genocure LBP available from Rahn, and Esacure KIP150 available from Sartomer. Other examples of photoinitiators include benzophenone, benzyldimethyl ketal, isopropylthioxanthone, bis(2,6-dimethoxybenzoyl)(2,4,4-trimethylpentyl) phosphineoxide, 2-hydroxy-2-methyl-1-phenyl-1-propanone, diphenyl(2,4,6-trimethybenzoyl) phosphine oxides, 1-hydroxycyclohexyl phenyl ketone, 2-benzyl-2-(dimethylamino)-1→4-(4-morpholinyl)phenyl-1-butanone, alpha,alpha-dimethoxy-alpha-phenylacetophenone, 2,2-diethoxyacetophenone, 2-methyl-1→4-(methylthio)phenyl-2-(4-morpholinyl)-1- -propanone, and 2-hydroxy-1-4-(hydroxyethoxy)phenyl-2-methyl-1-propanone.

Combinations of photoinitiators may be used to achieve the best possible cure of adhesive compositions. Photoinitiators are preferably used in the least amount necessary to get initiation of cure at the line speed of the process. The cure process is generally more efficient in the absence of oxygen, for example, in the presence of nitrogen, so a greater amount of photoinitiator is generally required in the presence of oxygen.

The hot melt adhesive of the present invention may also comprise about 0% by weight to about 40% by weight of an oil diluent. Suitable plasticizing or extending oils include olefin oligomers and low molecular weight polymers as well as vegetable and animal oil and their derivatives. The petroleum derived oils which may be employed are relatively high boiling materials containing only a minor proportion of aromatic hydrocarbons (preferably less than 30% and, more particularly, less than 15% by weight of the oil). Alternatively, the oil may be totally non-aromatic. Suitable oligomers include polypropylenes, polybutenes, hydrogenated polyisoprene, hydrogenated polybutadiene, or the like having average molecular weights between about 350 and about 10,000. Preferred are LUMINOL T350, a mineral oil available from Petrocanada and KAYDOL OIL available from Witco Corporation.

Antioxidants are typically added to the commercially available compounds in order to protect the ingredients against degradation during preparation and use of the adhesive compositions, however without interfering with the irradiation curing of the polymer. Combinations of antioxidants are often more effective due to the different mechanisms of degradation to which various polymers are subject. Certain hindered phenols, organo-metallic compounds, aromatic amines, aromatic phosphites, and sulphur compounds are useful for this purpose. Examples of effective types of these materials include phenolic antioxidants, thio compounds, and tris-(nonylated phenyl) phosphites.

Examples of commercially available antioxidants include IRGANOX 1010 (pentaetythrityl-tetrakis[3-(3,5-di-tert- -butyl-4-hydroxyphenyl)propionate); IONOL (2,6-di-tertiary-butyl-4-methyl phenol); IONOX 330 (3,4,6-tris (3,5-di-tertiary-butyl-p-hydroxybenzyl)-1,3,5-trimethylbenzene); and POLYGARD HR (tris-(2,4-di-tertiary-butyl-phenyl) phosphite).

To ensure long-term thermal stability, in general from about 0.1% to about 3% by weight of one or more antioxidants is included in the adhesive compositions, preferably from about 0.4% by weight to about 1.5% by weight.

Additional materials may be added optionally to the adhesive composition at up to about 15% by weight, preferably from about 5% by weight to about 10% by weight, dependent on the intended end-use of the adhesive. Such additional materials include, without limitation, block copolymers of monovinyl aromatic hydrocarbons and conjugated dienes such as polystyrene-polybutadiene-polystyrene, polystyrene-polyisoprene-polystyrene, poly (alpha-methyl-styrene)-polybutadiene-poly(alpha-methyl-styrene), poly(alpha-methyl-styrene)-polyisoprene-poly (alpha-methyl-styrene), as well as the hydrogenated modifications thereof, e.g. polystyrene-poly(ethylene-butylene)-polystyrene and polystyrene-poly(ethylene-propylene)-polystyrene. These copolymers may be prepared by methods taught, for example, in U.S. Pat. Nos. 3,239,478; 3,247,269; 3,700,633; 3,753,936; and 3,932,327, and are available from several manufacturers, including Shell Chemical Co. under the trade name KRATON.

Other non-limiting examples of additional materials include SBR random copolymers with low (<20%) or high (>20%) vinyl contents, available under the tradename DURADENE from Firestone (these high vinyl copolymers are reactive and contribute to the crosslinking of the system); EPDM copolymers which can react into the polymer network via unsaturated sites, and saturated analogs (e.g. EP rubber) that can modify the peel and tack of the adhesive and which are available from Exxon under the trade name VISTALON; butyl rubber, which is a copolymer of isoprene and isobutylene and is available from Exxon Chemical Company under the trade name SB BUTYL; Polyisobutylene, available from Exxon Chemical Company under the trade name VISTANEX; and liquid polyisopropylene such as is available from Kuraray Inc. under the trade name LIR.

In addition to the above-described additional materials, the various compositions of the present invention may include other additives known to those skilled in the art. These additives may include, but are not limited to, pigments, fillers, fluorescent additives, flow and leveling additives, wetting agents, surfactants, antifoaming agents, rheology modifiers, stabilizers, and antioxidants. Preferred additives are those which do not have appreciable absorption in the wavelengths of interest.

Examples of pigments and filler materials include, but are not limited to, titanium dioxide, hydrophobic amorphous fumed silica, amorphous precipitated silica, carbon black, and polymer powders. Examples of flow and leveling additives, wetting agents, and antifoaming agents include silicones, hydrocarbons, fluorine-containing compounds, and non-silicone polymers and copolymers such as copolyacrylates.

Other materials which may be added optionally to the adhesive composition include endblock resins which are substantially aromatic. Examples of such endblock resins can be prepared from any substantially aromatic monomers having a polymerizable unsaturated group. Typical examples of such aromatic monomers include the styrenic monomers, styrene, alpha-methyl styrene, vinyl toluene, methoxy styrene, tertiary butyl styrene, chloro styrene, etc., indene monomers including indene, and methyl indene. The aromatic endblock resin is preferably present in amounts of 5 to 20 weight percent. Preferred is HERCOLITE 240 or KRISTALEX 5140, both of which are alpha methyl styrene resins available from Hercules, Inc.

In a preferred embodiment of the present invention the adhesive composition comprises from about 20% to about 30% by weight block styrene-butadiene copolymer having about 60% by weight vinyl and about 26% by weight styrene; from about 45% to about 60% by weight of a hydrogenated tackifier resin; from about 0.5% to about 1.5% by weight of a photoinitiator; from about 10% to about 20% by weight of a white mineral oil; from about 0% to about 0.5% by weight of an acrylic antioxidant, from about 0% to about 0.5% by weight of a thioester antioxidant, and from about about 0% to about 0.5% by weight of a hindered phenol antioxidant; and from about 0% to about 10% by weight of a diblock copolymer.

For purpose of illustration, an adhesive composition useful in the practice of the invention comprises about 24% by weight block styrene-butadiene copolymer having about 60% by weight vinyl and about 26% by weight styrene; about 49.5% by weight of a DCPD tackifier resin; about 0.8% by weight of a photoinitiator; about 18% by weight of a white mineral oil; about 0.3% by weight of an acrylic antioxidant; about 0.3% by weight of a thioester antioxidant; about 0.2% by weight of a hindered phenol antioxidant; and about 6% by weight of an SB diblock copolymer.

The adhesive compositions of the invention are prepared by conventional methods. As an example, the block copolymers, the tackifying resin and other desired components may be blended at an elevated temperature, (e.g. temperature of about 300° F.) using an extruder, a Z-blade mixer or other conventional mixing device. A preferred method employs the process as disclosed in U.S. Pat. No. 3,937,760, the disclosure of which is incorporated herein by reference.

Polyurethane hot melt adhesives are comprised of isocyanate-terminated polyurethane polymers, often referred to as "prepolymers," that react with surface or ambient moisture in order to chain-extend and form a second polyurethane polymer.

Unlike conventional hot melt adhesives, which can be heated to a liquid state and cooled to a solid state repeatedly, a reactive hot melt undergoes an irreversible chemical reaction to a solid "cured" form once dispensed in the presence of ambient moisture.

The urethane prepolymers are those conventionally used in the production of polyurethane hot melt adhesive compositions. Any suitable compound which contains two or more isocyanate groups may be used for preparing the urethane prepolymers. Typically from about 5 to about 75 parts by weight of an isocyanate is used.

Organic polyisocyanate which may be used to practice the invention include alkylene diisocyanates, cycloalkylene diisocyanates, aromatic diisocyanates and aliphatic-aromatic diisocyanates. Specific examples of suitable isocyanate-containing compounds include, but are not limited to, ethylene diisocyanate, ethylidene diisocyanate, propylene diisocyanate, butylene diisocyanate, trimethylene diisocyanate, hexamethylene diisocyanate, toluene diisocyanate, cyclopentylene-1,3-diisocyanate, cyclohexylene-1,4-diisocyanate, cyclohexylene-1,2-diisocyanate, 4,4'-diphenylmethane diisocyanate, 2,2-diphenylpropane-4,4'-diisocyanate, xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, dichlorohexa-methylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, 4,4'-dimethyldiphenyl-methane-2,2',5,5-tetratetraisocyanate, and the like. While such compounds are commercially available, methods for synthesizing such compounds are well-known in the art. Preferred isocyanate-containing compounds are methylenebisphenyldiisocyanate (MDI), isophoronediisocyanate (IPDI) and toluene diisocyanate (TDI).

Most commonly, the prepolymer is prepared by the condensation polymerization of a polyisocyanate with a polyol, most preferably the polymerization of a diisocyanate with a diol. The polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol, as well as mixtures thereof. The polyol is typically used in an amount of between about 1 to about 70 parts by weight.

Examples of polyether polyols include a linear and/or branched polyether having plural numbers of ether bondings and at least two hydroxyl groups, and contain substantially no functional group other than the hydroxyl groups. Examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct at least one compound selected from the group consisting of ethylene glycol, propylene glycol, diethylene glycol, dipropylene glycol, triethylene glycol, 2-ethylhexanediol-1,3, glycerin, 1,2,6-hexane triol, trimethylol propane, trimethylol ethane, tris(hydroxyphenyl) propane, triethanolamine, triisopropanolamine, ethylenediamine and ethanolamine; with at least one compound selected from the group consisting of ethylene oxide, propylene oxide and butylene oxide.

A number of suitable polyols available commercially. By way of example only, there is mentioned CP4701 (Dow Chemicals), Niax 11–34 (Union Carbide Corp), Desmophen 3900 (Bayer), Propylan M12 (Lankro Chemicals), Highflex 303 (Daiichi Kogyo Seiyaku K. K.) and Daltocel T 32–75 (ICI). "Polymer polyols" are also suitable, i.e. graft polyols containing a proportion of a vinyl monomer, polymerised in situ, e.g., Niax 34–28.

Polyester polyols are formed from the condensation of one or more polyhydric alcohols having from 2 to 15 carbon atoms with one or more polycarboxylic acids having from 2 to 14 carbon atoms. Examples of suitable polyhydric alcohols include ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, dodecanediol, octanediol, chloropentanediol, glycerol monallyl ether, glycerol monoethyl ether, diethylene glycol, 2-ethylhexanediol-1,4, cyclohexanediol-1,4, 1,2,6-hexanetriol, 1,3,5-hexanetriol, 1,3-bis-(2-hydroxyethoxy)propane and the like. Examples of polycarboxylic acids include phthalic acid, isophthalic acid, terephthalic acid, tetrachlorophthalic acid, maleic acid, dodecylmaleic acid, octadecenylmaleic acid, fumaric acid, aconitic acid, trimellitic acid, tricarballylic acid, 3,3'-thiodipropionic acid, succinic acid, adipic acid, malonic acid, glutaric acid, pimelic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Preferred polycarboxylic acids are the aliphatic and cycloaliphatic dicarboxylic acids containing no more than 14 carbon atoms and the aromatic dicarboxylic acids containing no more than 14 atoms.

In addition, the urethane prepolymers may be prepared by the reaction of a polyisocyanate with a polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed above. In accordance with one embodiment of the invention, the hydroxyl containing acrylic polymer may function as the polyol component, in which case, no additional polyol need be added to the reaction.

Further, small amounts of low molecular weight dihydroxy, diamino, or amino hydroxy compounds may be used such as saturated and unsaturated glycols, e.g., ethylene glycol or condensates thereof such as diethylene glycol, triethylene glycol, and the like; ethylene diamine, hexamethylene diamine and the like; ethanolamine, propanolamine, N-methyidiethanolamine and the like.

The reactive hot melt adhesive may also be modified by incorporation of acrylic polymers, as describe in U.S. Pat. Nos. 5,021,507 and 5,866,656, and/or by incorporation of ethylene vinyl acetate copolymers.

In a preferred embodiment of the invention, the urethane is modified by the incorporation of acrylic resins, in particular reactive hydroxy-containing and non-reactive acrylic copolymers. Preferably between about 0 to about 80%, more preferably from about 0 to about 40%, most preferably from about 15 to about 35%, by weight of the hydroxylated and or non-hydroxylated acrylic polymer is present in the in the adhesive composition.

Virtually any ethylenically unsaturated monomer containing hydroxyl functionality greater than one may be utilized in the compositions of the present invention. Most commonly employed are hydroxyl substituted $C_1$, to $C_{12}$ esters of acrylic and methacrylic acids including, but not limited to hydroxyl substituted methyl acrylate, ethyl acrylate, n-butyl acrylate, 2-ethylhexyl acrylate, isobutyl acrylate, n-propyl or iso-propyl acrylate or the corresponding methacrylates. Mixtures of compatible (meth)acrylate monomers may also be used. Additional monomers that may be used include the hydroxyl substituted vinyl esters (vinyl acetates and vinyl propionate), vinyl ethers, fumarates, maleates, styrene, acrylonitrile, etc. as well as comonomers thereof.

If used as monomers, these monomers are blended with other copolymerizable comonomers as formulated so as to have a wide range of Tg values, as between about −48° C. and 105° C., preferably 15° C. to 85° C. Suitable comonomers include the $C_1$ to $C_{12}$ esters of acrylic and methacrylic acids including, but not limited to methyl acrylate, ethyl acrylate, n-butyl acrylate, isobutyl acrylate, 2-ethylhexyl acrylate, n-propyl or iso-propyl acrylate or the corresponding methacrylates. Mixtures of compatible (meth)acrylate monomers may also be used. Additional monomers that may be used include the vinyl esters (vinyl acetate and vinyl propionate), vinyl ethers, fumarates, maleates, styrene, acrylonitrile, ethylene, etc. as well as comonomers thereof.

The hydroxyl containing monomers may be the same or different from the monomers used in the remainder of the acrylic polymerization. The particular monomers selected will depend, in large part, upon the end use for which the adhesives are intended. Thus, adhesives to be used in pressure sensitive applications or in applications wherein adhesion to metal is required will be selected to obtain a lower Tg polymer than may be desired in non-pressure sensitive applications or those involving more easily bonded substrates.

When the adhesive is to be prepared utilizing monomeric materials, the respective monomers may be added to the polyols and polymerized therein prior to formation of the prepolymer or may be added to the already formed prepolymer and the acrylic polymerization subsequently performed. In the case of polyamino or polymercapto containing prepolymers, in-situ vinylic polymerization must be performed only in the pre-formed prepolymer.

The hydroxyl containing ethylenically unsaturated monomer is polymerized using conventional free radical polymerization procedures to a relatively low molecular weight. For purposes of clarification herein, by "low molecular weight" is meant number average molecular weights in the range of approximately 2,000 to 25,000, preferably 4,000 to 15,000. Molecular weight distribution is characterized by Gel Permeation Chromatography using a PL Gel,Mixed 10 micron column, a Shimadzu Model RID 6A Detector with a tetrahydrofuran carrier solvent at a flow rate of 1 milliliter per minute. The low molecular weight is obtained by careful monitoring and controlling the reaction conditions and, generally, by carrying out the reaction in the presence of a chain transfer agent such as dodecyl mercaptan. Subsequent to the polymerization of the ethylenically unsaturated monomer(s), the polyisocyanate and any additional ingredients required for the urethane prepolymer forming reaction are added and that reaction is carried out using conventional condensation polymerization procedures. In this manner, the resultant isocyanate terminated urethane prepolymer forms the reactive curing hot melt adhesive described above which contains about 10 to 70% of the urethane prepolymer and 30 to 90% of the low molecular weight hydroxyl containing polymer.

It is also possible to polymerize the low molecular weight polymer in the presence of the already formed isocyanate terminated urethane prepolymer. This method has the drawback of subjecting the prepolymer to unnecessary heating during the acrylic polymerization, heating that might result in branching, viscosity increase, depletion of needed isocyanate groups and possible gellation. Although these disadvantages are subject to control, more stringent control of conditions are required as compared to polymerization in the non-isocyanate functional urethane components. When the reaction is run in the polyol or other non-isocyanate containing component, there is also the advantage of lower reaction viscosities and reduced exposure to isocyanate vapors because of the lesser amount of heating required.

Optionally, the hydroxyl containing functionality may be introduced into the adhesive in the form of pre-polymerized low molecular weight hydroxyl containing polymers. In the latter case, typical polymers include hydroxyl substituted butyl acrylate, hydroxylated butyl acrylate/methyl methacrylate copolymers, hydroxylated ethyl acrylate/methyl methacrylate copolymers, and the like, the polymers having a number average molecular weight of 2,000 to 25,000 and a hydroxyl number of 5 to 15. If used in the form of low molecular weight polymers, the polymers may be blended with the polyol prior to reaction thereof with the isocyanate or they may be added directly to the isocyanate terminated prepolymer.

Preferred adhesives of the invention typically comprise from about 5 to about 50 parts by weight of an isocyante, from about 1 to about 70 parts by weight of a polyol, and from about 0 to about 80 parts by weight of an acrylic copolymer. The polyol may be a polyester polyol, a polyether polyol or a combination thereof.

While the adhesives may be used directly as described above, if desired the adhesives of the present invention may also be formulated with conventional additives which are compatible with the composition. Such additives include plasticizers, compatible tackifiers, catalysts, fillers, antioxidants, pigments, adhesion promotors, stabilizers and the like. Conventional additives which are compatible with a composition according to this invention may simply be determined by combining a potential additive with the composition and determining if they are compatible. An additive is compatible if it is homogenous within the product.

The reactive hot melt adhesives of the invention may also contain flame retardant components. Fire retardant additives known in the art for imparting flame resistance to polyurethane compositions may be added. Such compounds include inorganic compounds such as a boron compound, aluminum hydroxide, antimony trioxide and the like, and other halogen compounds including halogen-containing phosphate compounds such as tris(chloroethyl)phosphate, tris(2,3-dichloropropyl)-phosphate, and the like. These and other flame retarding compositions are described in U.S. Pat. Nos. 3,773,695 4,266,042, 4,585,806, 4,587,273 and 4849467, and European Patent No. 0 587 942. In a preferred embodiment, ethylenebistetrabromophthalimide and/or tris(2,3-dibromopropyl)-isocyanurate is added as a prime flame retardant component. The ethylenebistetrabromophthalimide and/or tris(2,3-dibromopropyl)isocyanurate may be used with or without other flame retardants. The composition may further comprise a chlorinated paraffin and/or an aryl phosphate ester as a further flame retardant component. The optional chlorinated paraffin imparts flame retardancy as well as performing as a viscosity modifier. The aryl phosphate ester further imparts improved adhesion to the substrates. The flame retardant polyurethane-based reactive hot melt adhesives when used in the practice of the invention gives excellent flame retardancy while maintaining the targeted properties of the base polymer, such as good green strength, controlled setting speed and good thermal stability at elevated temperatures.

When a reactive hot melt is used in the practice of the invention, the finished case is subjected to conditions which will allow the adhesive to cure to a composition having an irreversible solid form, said conditions comprising moisture.

The invention can be illustrated by the following non-limiting examples.

EXAMPLE

Adhesive samples were prepared by melting and mixing until homogeneous components listed in Table 1 (% by weight). Mix temperatures were held at about 350° F. Each adhesive was prepared by first dissolving any stabilizers in the diluent and then adding polymer. After the polymer was melted and homogenized the tackifying resin was added and mixed until fully and uniformly dissolved.

TABLE 1

|  | A | B | C | D | E |
|---|---|---|---|---|---|
| SR-8296 | 22 | 0 | 0 | 0 | 0 |
| Stereon 857 | 0 | 22 | 24 | 26 | 26 |
| Escorez 5400 | 54.5 | 54.5 | 52.6 | 50.6 | 0 |
| Escorez 5300 | 0 | 0 | 0 | 0 | 50.6 |
| Kaydol USP | 22 | 22 | 22 | 22 | 22 |
| Irgacure 651 | 0.8 | 0.8 | 0.8 | 0.8 | 0.8 |
| Irganox 3052 | 0.3 | 0.3 | 0.3 | 0.3 | 0.3 |
| Viscosity @ 300° F. (cps) | 17,300 | 2,700 | 3140 | 4300 | 5087 |

SR-8296 is a high vinyl four arm radial multi-block styrene-butadiene copolymer commercially available from Firestone comprising 60% vinyl, 26% styrene and a molecular weight distribution or approximately ($Mn=94,200$ and $Mw=276,100$). Stereon 857 is a high vinyl linear styrene-butadiene multi-block copolymer having 57% vinyl, 44% styrene, melt index=13 (cond. G), ($Mw=85,000$ and $Mn=54,000$) available from Firestone. Escorez 5400 is a hydrogenated cyclic or $C_5$ resin available from Exxon. Escorez 5300 is a hydrogenated DCPD resin available from Exxon. Kaydol USP is a substantially non-aromatic petroleum based oil available from Witco Corporation. Irgacure 651 is a photo-initiator available from Ciba Giegy. Irganox 3052 is an anti-oxidant stabilizer available from Ciba Giegy.

The formulation of Sample A used SR-8296. Rheology comparison of animal glue to the adhesive formulation of Sample A cured and uncured shows that in the cured state adhesive Sample A behaves equivalently to the animal glue, thus affording freedom from bleed through in the embossing operation.

The formulation of Samples B, C and D use another high vinyl polymer Stereon 857. Rheology of these products also shows excellent similarity to animal glue. These formulations have the added advantage of viscosity equivalence to animal glue thus requiring less modification of current application equipment. Sample D provided an excellent balance of viscosity and cured rheology.

The formulation of Sample E contains an alternate preferred tackifier. Rheology shows it works well in simulating the performance of animal glue also.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A case for a hard cover book comprising a radiation curable hot melt adhesive.

2. The case of claim 1 wherein the radiation curable hot melt adhesive is a UV curable hot melt adhesive.

3. The case of claim 1 wherein the adhesive comprises at least one block copolymer comprising a high vinyl styrene-butadiene-styrene block copolymer and a photoinitiator.

4. The case of claim 3 wherein the block copolymer is a radial block copolymer.

5. The case of claim 3 wherein the block copolymer is a linear block copolymer.

6. The case of claim 1 wherein the adhesive comprises a mono epoxidized mono hydrated diene polymer and a photoinitiator.

7. The case of claim 1 which as embossed.

8. The case of claim 1 comprising cover boards and a porous cover stock.

9. A method of forming a case for a hard cover book comprising bonding cover boards to cover stock material using a radiation curable hot melt adhesive.

10. The method of claim 9 wherein the radiation curable hot melt adhesive is a UV curable hot melt adhesive.

11. The method of claim 9 wherein the adhesive comprises at least one block copolymer comprising a high vinyl styrene-butadiene-styrene block copolymer and a photoinitiator.

12. The method of claim 11 wherein the block copolymer is a radial block copolymer.

13. The method of claim 11 wherein the block copolymer is a linear block copolymer.

14. The method of claim 9 wherein the adhesive comprises a mono epoxidized mono hydrated diene polymer and a photoinitiator.

15. The method of claim 9 further comprising embossing the formed case.

16. A method of claim 9 wherein the cover stock material is a porous cover stock material.

* * * * *